(12) United States Patent
Fujimoto (10) Patent No.: US 7,623,778 B2
(45) Date of Patent: Nov. 24, 2009

(54) PHOTOGRAPHIC SYSTEM, PHOTOGRAPHIC DEVICE AND PHOTOGRAPHIC METHOD

(75) Inventor: Shinichi Fujimoto, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 535 days.

(21) Appl. No.: 11/703,648

(22) Filed: Feb. 8, 2007

(65) Prior Publication Data

US 2007/0223901 A1 Sep. 27, 2007

(30) Foreign Application Priority Data

Mar. 27, 2006 (JP) .............................. 2006-086580

(51) Int. Cl.
*G03B 41/00* (2006.01)
(52) U.S. Cl. ........................................ 396/57; 396/333
(58) Field of Classification Search ............ 396/56–59; 348/211.99, 211.2, 211.11
See application file for complete search history.

(56) References Cited

U.S. PATENT DOCUMENTS

| | | | |
|---|---|---|---|
| 6,940,543 B2* | 9/2005 | Perotti et al. ............. | 348/211.2 |
| 7,136,094 B2* | 11/2006 | Ziemkowski ............. | 348/211.1 |
| 2003/0133018 A1* | 7/2003 | Ziemkowski ............. | 348/211.2 |
| 2006/0171695 A1* | 8/2006 | Jung et al. ............. | 396/56 |
| 2007/0058959 A1* | 3/2007 | Clark .................. | 396/56 |

FOREIGN PATENT DOCUMENTS

JP A 2005-73201 3/2005

* cited by examiner

*Primary Examiner*—W. B. Perkey
(74) *Attorney, Agent, or Firm*—Margaret A. Burke; Sheldon J. Moss (57) ABSTRACT

A photographic system of plural photographic devices includes a master device, which is a device that is instructed to prepare for the photographing, is provided. The master device includes a request section that requests photographic condition information from another device; a receiving section that receives the photographic condition information; a first setting section that computes photographic condition information for use in the entire photographic system using the received photographic condition information and photographic condition information acquired by itself, and sets the computed photographic condition information as its own photographic condition information; a provision section which provides the computed photographic condition information to the other device; a first photograph execution section which executes the photographing based on the set photographic condition information; and an instruction section which instructs execution of the photographing to the other device.

21 Claims, 7 Drawing Sheets

PHOTOGRAPHIC SYSTEM, PHOTOGRAPHIC DEVICE AND PHOTOGRAPHIC METHOD

CROSS-REFERENCE TO RELATED APPLICATION

This application claims priority under 35USC 119 from Japanese Patent Application No. 2006-086580, the disclosure of which is incorporated by reference herein.

BACKGROUND OF THE INVENTION

1. Field of the Invention

The present invention relates to a photographic system, photographic device and photographic method and more particularly to a photographic system which photographs an object with a plurality of photographic devices set to an identical photograph condition, a photographic device which constitutes the aforementioned system and a photographic method for the system.

2. Description of the Related Art

With prevailing of network in recent years, a number of photographic devices such as digital camera possess network function. The network function of the photographic device is provided through USB, IEEE1394 or wireless LAN so that the photographed digital image data can be sent to a PC or the like.

Possessing the network function enables not only the aforementioned image data but also a variety of data to be transmitted/received. Japanese Patent Application Laid-Open (JP-A) No. 2005-73201 discloses a camera capable of setting the same photographic condition as a photographic condition set in other camera by transmitting and receiving the photographic condition.

However, the technology disclosed in JP-A No. 2005-73201 sets a photographic condition set by a skilled person to the cameras other than the camera set by the skilled person and does not consider photographic conditions in the other cameras.

Thus, when an object is photographed with plural cameras, if the position of the camera whose photographic condition is set by the skilled person and the position of other cameras which received and set that photographic condition are different from each other, the statuses of images photographed with those cameras will be completely different.

SUMMARY OF THE INVENTION

In views of the above-described circumstances, the present invention is to provide a photographic system capable of photographing by plural photographic devices so that statuses of the photographed images obtained by the plural photographic devices are identical, a photographic device which constitutes the photographic system and a photographic method for the photographic system.

A first aspect of the present invention is a photographic system including a plurality of photographic devices that are configured to set photographic condition information including at least one of AE information, AF information and AWB information and to execute photographing based on the photographic condition information, the plurality of photographic devices including a master photographic device, which is a photographic device that is instructed to prepare for the photographing, wherein the master photographic device includes: a request section that requests the photographic condition information from another photographic device; a receiving section that receives the photographic condition information sent from the other photographic device in response to the request; a first setting section that computes photographic condition information for use in the entire photographic system according to a predetermined equation using the received photographic condition information and photographic condition information acquired by the master photographic device itself based on the status of an object of the photographing, and sets the computed photographic condition information as its own photographic condition information; a provision section which provides the computed photographic condition information to the other photographic device; a first photograph execution section which executes the photographing based on the set photographic condition information; and a photograph execution instruction section which instructs execution of the photographing to the other photographic device, and each of the other photographic devices comprises a sending section which sends photographic condition information acquired by the other photographic device based on the status of the object of the photographing to the master photographic device when the photographic condition information is requested by the master photographic device.

By this configuration, a photographic system capable of photographing by plural photographic devices so that statuses of photographed images obtained by the plural photographic devices are identical can be provided.

In the above photographic system, each of the other photographic devices may further include: a second setting section that sets the provided computed photographic condition information as its own photographic condition information; and a second photograph execution section which executes the photographing based on the photographic condition information set by the second photographic condition information setting section, when execution of the photographing is instructed by the master photographic device.

With this structure, the other photographic device(s) can set the computed photographic condition information provided by the master photographic device as its own photographic condition information.

A second aspect of the invention provides a photographic system including a plurality of photographic devices configured to set photographic condition information including at least one of AE information, AF information and AWB information and to execute photographing based on the photographic condition information, the plurality of photographic devices including a master photographic device, which is a photographic device that is instructed to prepare for the photographing, wherein the master photographic device includes: a first request section that requests the photographic condition information from another photographic device; a first receiving section that receives the photographic condition information sent from the other photographic device in response to the request; a first sending section that sends photographic condition information acquired by the master photographic device based on the status of an object of the photographing to the other photographic device when the photographic condition information is requested by the other photographic device; a first setting section that computes photographic condition information for use in the entire photographic system according to a predetermined equation using the photographic condition information received by the first receiving section and the photographic condition information acquired by the master photographic device and sets the computed photographic condition information as its own photographic condition information; a first photograph execution section that executes the photographing based on the photographic condition information set by the first setting section; and a photograph execution instruction section that instructs execution of the photographing to the other photographic device, and each of the other photographic devices comprises a second sending section that sends photographic condition information acquired by the other photographic device itself based on the status of the object of the photographing to the master photographic device when the photographic condition information is requested by the master photographic device.

By this configuration, a photographic system capable of photographing by a plurality of photographic devices so that statuses of photographed images obtained by the plural photographic devices are identical can be provided.

In the above photographic system, each of the other photographic devices may further include: a second request section that requests the photographic condition information from the other photographic devices; a second receiving section that receives the photographic condition information sent from the other photographic devices in response to the request; a second setting section that computes photographic condition information for use in the entire photographic system according to a predetermined equation using the photographic condition information acquired by the second request section and photographic condition information acquired by the photographic device itself based on the status of an object of the photographing and sets the computed photographic condition information as its own photographic condition information; and a second photographing execution section that executes photographing when execution of the photographing is instructed by the master photographing device.

With this structure, other photographic device(s) can compute its own photographic condition information and set the photographic condition information obtained by the computation as its own photographic condition information.

The present invention can be achieved as a photographic method for the aforementioned photographic system and a photographic device which constitutes the photographic system.

A third aspect of the invention provides a photographic method in a photographic system including a plurality of photographic devices configured to set at least one item of photographic condition information and to execute photographing according to the set photographic condition information, the method including: a first photographic device of the plurality of the photographic devices receiving a photographing preparation instruction; the first photographic device performing: requesting a photographic condition information from a second photographic device; receiving photographic condition information sent from the second photographic device in response to the request from the first photographic device; computing photographic condition information for use in the entire photographic system according to a predetermined equation using the received photographic condition information and photographic condition information acquired by the first photographic device based on the status of an object of the photographing and setting the computed photographic condition information as its own photographic condition information; providing the computed photographic condition information to the second photographic device; and executing the photographing based on the set photographic condition information in accordance with reception of a photograph execution instruction and instructing execution of the photographing to the second photographic device.

A fourth aspect of the invention provides a photographic device for a photographic system including a plurality of photographic devices, the photographic device configured to set at least one item of photographic condition information and to execute photographing with the set photographic condition information, the photographic device including: an instruction receiving section that receives a photographing preparation instruction and a photographing execution instruction; a request section that requests photographic condition information from another photographic device in accordance with the photographing preparation instruction; a receiving section that receives the photographic condition information sent from the other photographic device; a setting section that computes photographic condition information for use in the entire photographic system according to a predetermined equation using the received photographic condition information and photographic condition information acquired by the photographic device based on the status of an object of the photographing and sets the computed photographic condition information as its own photographic condition information; a provision section that provides the set photographic condition information to the other photographic device; and a photographing execution section that executes the photographing based on the set photographic condition information in accordance with reception of a photographing execution instruction and instructs execution of the photographing to the other photographic device if the photographing preparation instruction has been received.

Consequently, the present invention enables to provide a photographic system capable of photographing by plural photographic devices so that statuses of photographed images obtained by the plural photographic devices are identical.

BRIEF DESCRIPTION OF THE DRAWINGS

Exemplary embodiment of the present invention will be described in detail based on the following figures, wherein.

DETAILED DESCRIPTION OF THE INVENTION

Hereinafter, the embodiment of the invention will be described in detail. In this embodiment, the photographic device will be described as a digital camera.

Figure 1:
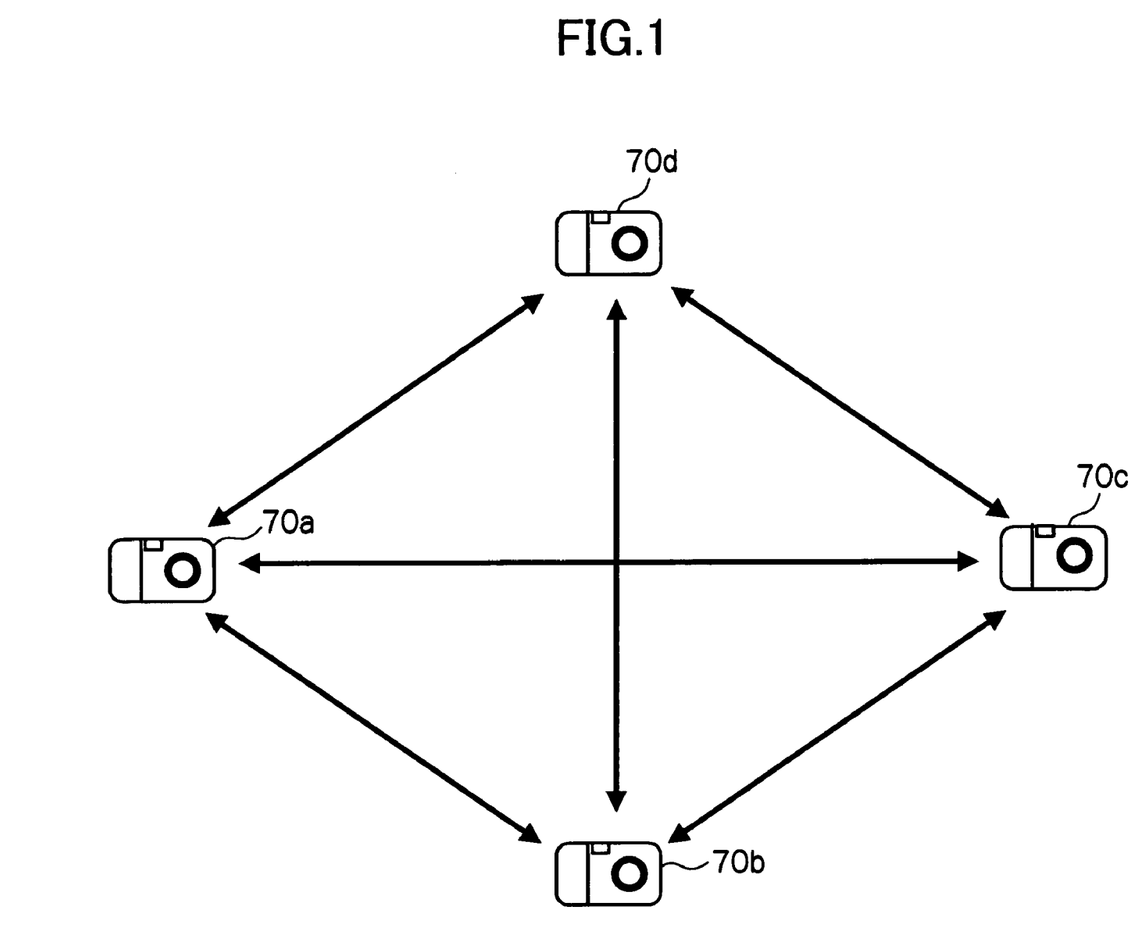
FIG. 1 is a diagram showing an overall structure of a photographic system according to an embodiment of the invention.

First, an overall structure of the photographic system according to the embodiment of the invention will be described with reference to FIG. 1. FIG. 1 shows digital cameras 70a, 70b, 70c, and 70d capable of communicating with each other through wireless LAN or the like.

When preparation for photographing is instructed by user through one of the digital cameras 70a, 70b, 70c, and 70d shown herein, for example at the digital camera 70a, the digital cameras 70a, 70b, 70c, 70d transmit and receive photographic condition information with each other. Then, by executing computation described later, identical photographic condition information is set in the digital cameras 70a, 70b, 70c, and 70d. When photographing is instructed by the user after the setting, the photographing instruction is sent from the digital camera 70a to the digital cameras 70b, 70c, and 70d to execute photographing. Consequently, a photographic system capable of photographing by plural photographic devices so that statuses of photographed images obtained by the plural photographic devices are identical can be provided.

The above-mentioned photographic condition information is information including at least one of automatic exposure (AE) information, auto focus (AF) information and auto white balance (AWB). Preparation of photographing by a user means that a release button described later is pressed half by the user. Instruction of photographing by a user means that the release button is pressed fully by the user.

Figure 2:
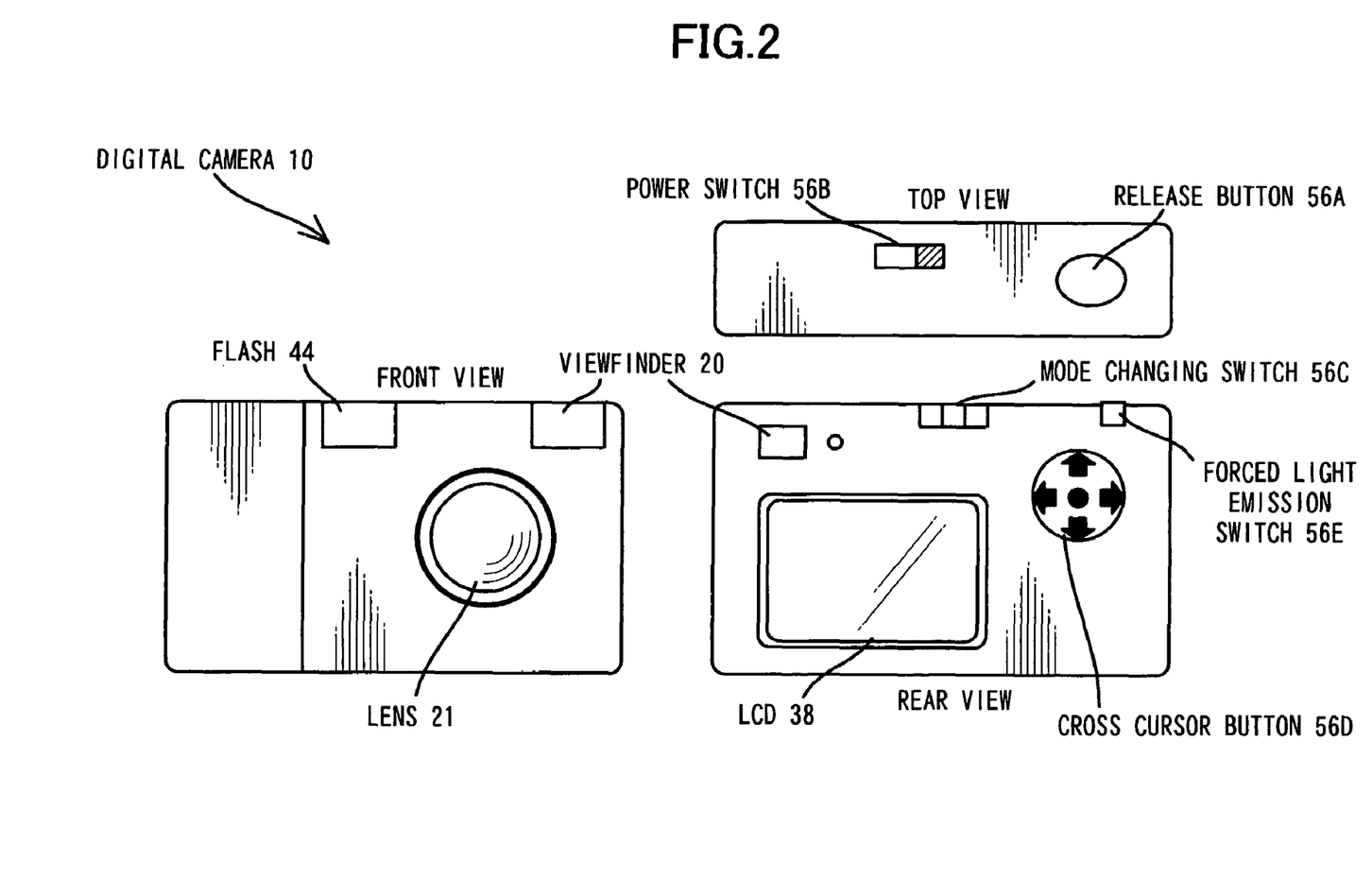
FIG. 2 is a diagram showing the structure of appearance of a digital camera according to the embodiment.

Next, the configuration of appearance of the digital camera according to the present embodiment will be described with reference to FIG. 2. The above-described digital cameras 70a, 70b, 70c, and 70d will be explained as a digital camera 10.

A lens 21, a flash 44 and a viewfinder 20 are provided at a front face of the digital camera 10. The lens 21 is for focusing an image of an object of photographing. The flash 44 emits light which illuminates the object at a time of image capture, in accordance with requirements. The viewfinder 20 is used for determining the composition of the object to be captured. A release button (the "shutter") 56A, and a power switch 56B are provided at an upper face of the digital camera 10. The release button 56A is pressed for operation when image capture is to be executed.

The release button 56A of the digital camera 10 relating to the present embodiment is structured to be capable of sensing a two-stage pressing operation: a state which is pressed down to an intermediate position (hereinafter referred to as a half-pressed state) and a state which is pressed beyond the intermediate position to a lowermost position (hereinafter referred to as a full-pressed state).

In the digital camera 10, an AE (automatic exposure) function operates and exposure conditions (shutter speed and aperture) are specified when the release button 56A is half-pressed. Thereafter, an AF (auto focus) function operates to regulate focusing, and exposure (image capture) is performed when the release button 56A is further pressed to the full-pressed state.

At a rear face of the digital camera 10, an eyepiece portion of the aforementioned viewfinder 20, the liquid crystal display (hereinafter referred to as "LCD") 38 and a mode-changing switch 56C are provided. The LCD 38 is for displaying captured images, menu screens and the like. The mode-changing switch 56C is slid for operation when one of an image capture mode and a playback mode is to be selected. The image capture mode is a mode for performing photography of images. The playback mode is a mode for replaying photographed images at a liquid crystal display 38.

Also provided at the rear side of the digital camera 10 are a cross cursor button 56D, and a forced light-emission switch 56E which is pressed and operated at the time of setting a forced light-emission mode which is a mode for forcibly making the flash 44 emit light at the time of photographing.

The cross cursor button 56D is structured so as to include a total of five keys, which are four arrow keys showing the directions of movement in the four directions of top, bottom, left, right in the display region of the LCD 38, and a select key positioned at the center of these four arrow keys.

Figure 3:
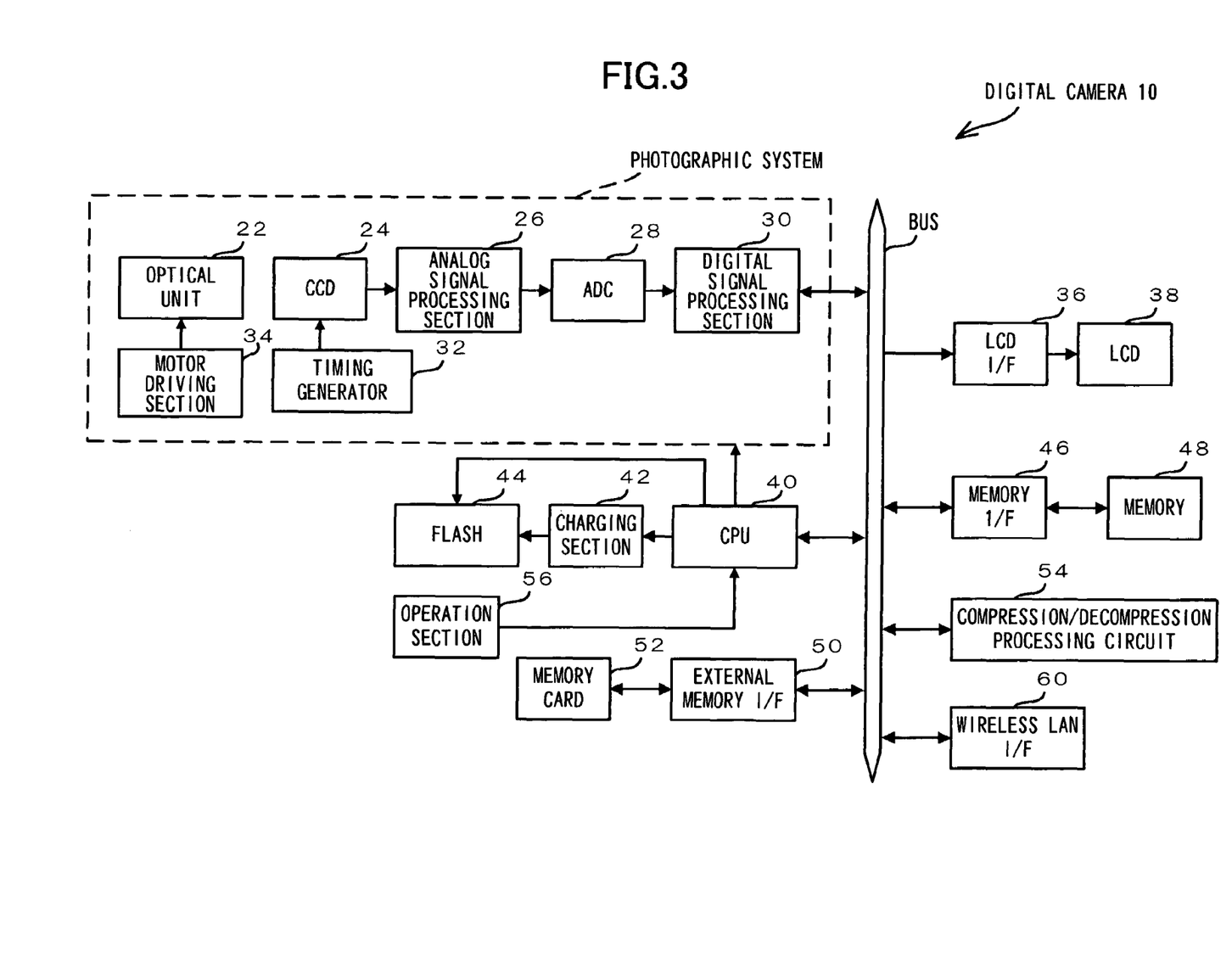
FIG. 3 is a diagram showing the electrical configuration of the digital camera according to the embodiment.

The structure of the electrical system of the digital camera 10 relating to the present embodiment will next be described with reference to FIG. 3.

The digital camera 10 includes an optical unit 22 which includes the aforementioned lens 21, a charge coupled device (hereinafter, referred to as "CCD") 24 disposed at the rear of the optical axis of the lens 21, and an analog signal processing section 26 carrying out various types of analog signal processing with respect to inputted analog signals.

The digital camera 10 also includes an analog/digital converter (hereinafter, referred to as "ADC") 28 converting an inputted analog signal into digital data, and a digital signal processing section 30 carrying out various types of digital signal processing on inputted digital data.

A line buffer of a predetermined capacity is incorporated in the digital signal processing section 30. The digital signal processing section 30 also performs control for directly storing of inputted digital data into a predetermined region of a memory 48 which will be described later.

The output end of the CCD 24 is connected to the input end of the analog signal processing section 26. The output end of the analog signal processing section 26 is connected to the input end of the ADC 28. The output end of the ADC 28 is connected to the input end of the digital signal processing section 30. Accordingly, the analog signal, which is outputted from the CCD 24 and expresses the image of the object, is subjected to predetermined analog signal processing by the analog signal processing section 26, is converted into a digital image signal by the ADC 28, and thereafter, the digital image signal is inputted to the digital signal processing section 30.

The digital camera 10 also includes an LCD interface 36 which generates signals for displaying on the LCD 38 the image of the object, menu screens or the like, and supplies these signals to the LCD 38; a CPU (central processing unit) 40 governing operation of the digital camera 10 overall; the memory 48 storing the digital image data obtained by photographing, and the like; and a memory interface 46 controlling access to the memory 48.

The digital camera 10 is further structured to include an external memory interface 50, a compression/decompression processing circuit 54 and a wireless LAN interface 60. The external memory interface 50 is for enabling access by the digital camera 10 to a portable memory card 52. The compression/decompression processing circuit 54 performs compression processing and decompression processing on the digital image data. The wireless LAN interface 60 is for enabling communications with another digital camera or the like.

In the digital camera 10 of the present embodiment, a VRAM (Video RAM) is employed as the memory 48 and a SMART MEDIAN is employed as the memory card 52.

The digital signal processing section 30, the LCD interface 36, the CPU 40, the memory interface 46, the external memory interface 50, the compression/decompression processing circuit 54 and the wireless LAN interface 60 are connected to one another via a system bus BUS. Thus, the CPU 40 can perform control of operations of the digital signal processing section 30 and the compression/decompression processing circuit 54, display various kinds of information on the LCD 38 via the LCD interface 36, communication using the wireless LAN interface 60, and implement access to the memory 48 and the memory card 52 via the memory interface 46 and the external memory interface 50.

A timing generator 32, which mainly generates a timing signal for driving the CCD 24 and supplies the timing signal to the CCD 24, is provided at the digital camera 10. The driving of the CCD 24 is controlled by the CPU 40 via the timing generator 32.

A motor driving section 34 is provided at the digital camera 10. Driving of a focal point adjusting motor, a zoom motor, and an aperture driving motor, which are provided at the optical unit 22 and none of which is illustrated, is controlled by the CPU 40 via the motor driving section 34.

Namely, the lens 21 in the present embodiment has plural lenses, and is structured as a zoom lens which can change the focal length (change the magnification), and has a lens driving mechanism (not illustrated). The aforementioned focal point adjusting motor, zoom motor, and aperture driving motor are included in the lens driving mechanism. These motors are respectively driven by driving signals supplied from the motor driving section 34 in accordance with control of the CPU 40.

The above-described release button 56A, power switch 56B, mode-changing switch 56C, cross cursor button 56D and forced light-emission switch 56E (collectively referred to as "operation portions 56" in FIG. 3) are connected to the CPU 40. The CPU 40 can at all times know of the states of operation of these operation portions 56.

A charging section 42 is provided at the digital camera 10. The charging section 42 is interposed between the flash 44 and the CPU 40, and, in accordance with control of the CPU 40, charges electricity for causing the flash 44 to emit light. The flash 44 is also connected to the CPU 40, and the emission of light by the flash 44 is controlled by the CPU 40.

Next, the overall operation of the digital camera 10 of the present embodiment at the time of photographing will be briefly described.

First, the CCD 24 carries out image pick-up via the optical unit 22, and successively outputs, to the analog signal processing section 26, analog signals of R (red), G (green), and B (blue) which express the image of the object. The analog signal processing section 26 carries out analog signal processing, such as correlated double sampling and the like, on the analog signals inputted from the CCD 24, and thereafter, successively outputs the processed signals to the ADC 28.

The ADC 28 converts the R, G, B analog signals inputted from the analog signal processing section 26 into R, G, B signals (digital image data) of 12 bits each, and successively outputs the signals to the digital signal processing section 30. The digital signal processing section 30 accumulates, in the line buffer incorporated therein, the digital image data successively inputted from the ADC 28, and directly stores the data in a predetermined region of the memory 48 temporarily.

The digital image data which is stored in the predetermined region of the memory 48 is, in accordance with control by the CPU 40, read-out by the digital signal processing section 30. White balance adjustment is carried out by applying a digital gain corresponding to a predetermined physical amount, and gamma processing and sharpness processing are carried out, such that, digital image data of predetermined bit number, for example 8-bit, is generated.

Then, the digital signal processing section 30 carries out YC signal processing on the generated digital image data of predetermined bit, and generates a luminance signal Y and chroma signals Cr, Cb (hereinafter called "YC signals"), and stores the YC signals in a region of the memory 48 which is different than the aforementioned predetermined region.

The LCD 38 displays the dynamic image (through image) obtained by the continuous image pick-up by the CCD 24, and is structured so as to be able to be used as a finder. When the LCD 38 is used as a finder, the generated YC signals are successively outputted to the LCD 38 via the LCD interface 36. The through image is thereby displayed on the LCD 38.

Here, when the release button 56A is half-pressed by the user, as described above, processing which will be described later works and the shooting condition is set. Thereafter, if the user continues to push the release button 56A to its full-pressed state, the YC signals stored in the memory 48 at that point in time are compressed by the compression/decompression processing circuit 54 in a predetermined compression format (JPEG in the present embodiment), and thereafter, are recorded in the memory card 52 via the external memory interface 50.

A protocol used in the communication among the digital cameras 70a, 70b, 70c and 70d described above may be UDP whose processing is light, when transmitting data which may permit certain lose of packets like digital image data, or otherwise TCP which ensures a reliability in case of transmitting, for example, photographic condition information.

Hereinafter, processings of the digital cameras 70a, 70b, 70c, and 70d will be described with reference to flow charts. In the following description, a digital camera instructed to be in standby for photographing by a user is expressed as a master device and the other digital camera(s) except the master device is expressed as slave device(s).

In the following description, two types of photographic condition setting processing will be described. A first processing is a processing such that an identical photographic condition is set to the digital cameras by providing computed photographic condition information computed by the master device to the slave devices. A second processing is a processing such that each of the digital cameras receives photographic condition from other digital cameras and executes computation based on the received photographic condition so as to set an identical photographic condition to the digital cameras.

Prior to description of these processings, computation of the photographic condition information (AE information, AF information, and AWB information), which is performed in each processing, will be described. All of the aforementioned photographic condition information is information that is quantified (digitalized) within the digital camera. Therefore, an average value of the photographic condition information may be employed as the computed photographic condition information (the computed photographic condition information for the entire system). An equation for the operation (computation) in this case will be an equation for obtaining the average value of the photographic condition information.

More specifically, each digital camera determines a value obtained by dividing a sum of total values of the photographic condition information received from other digital cameras and a value of photographic condition information acquired by the digital camera itself based on a object of photographing by a value indicating the quantity of all of the digital cameras in the system as the computed photographic condition information.

For example, because the AE information includes information indicating brightness of a background image and information indicating colors such as RGB, an average of values indicating the brightness can be determined as computed AE information. Further, as the AE information, shutter speed, aperture value and/or sensitivity may be included.

As for the AF information, for example, an average of distances measured by each of the digital cameras can be determined as computed AF information. The AWB information is often expressed with tables each corresponding to each of light sources. The table may be digitalized in, for example, a two-dimensional array a[n][m]. Therefore, for example, if two digital cameras are provided, when the AWB information acquired by a digital camera itself based on a object is a[n][m] and the AWB information received from other digital camera is b[n][m], a new table including (a[n][m]+b[n][m])/2 of elements, which is a value obtained by dividing a sum of the respective arrays by 2, can be determined as computed AWB information.

The computations described above are merely examples for explanation. Since the intention of the present embodiment is to set identical photographic condition information for all of the digital cameras, of course other equations can be employed.

Figure 4:
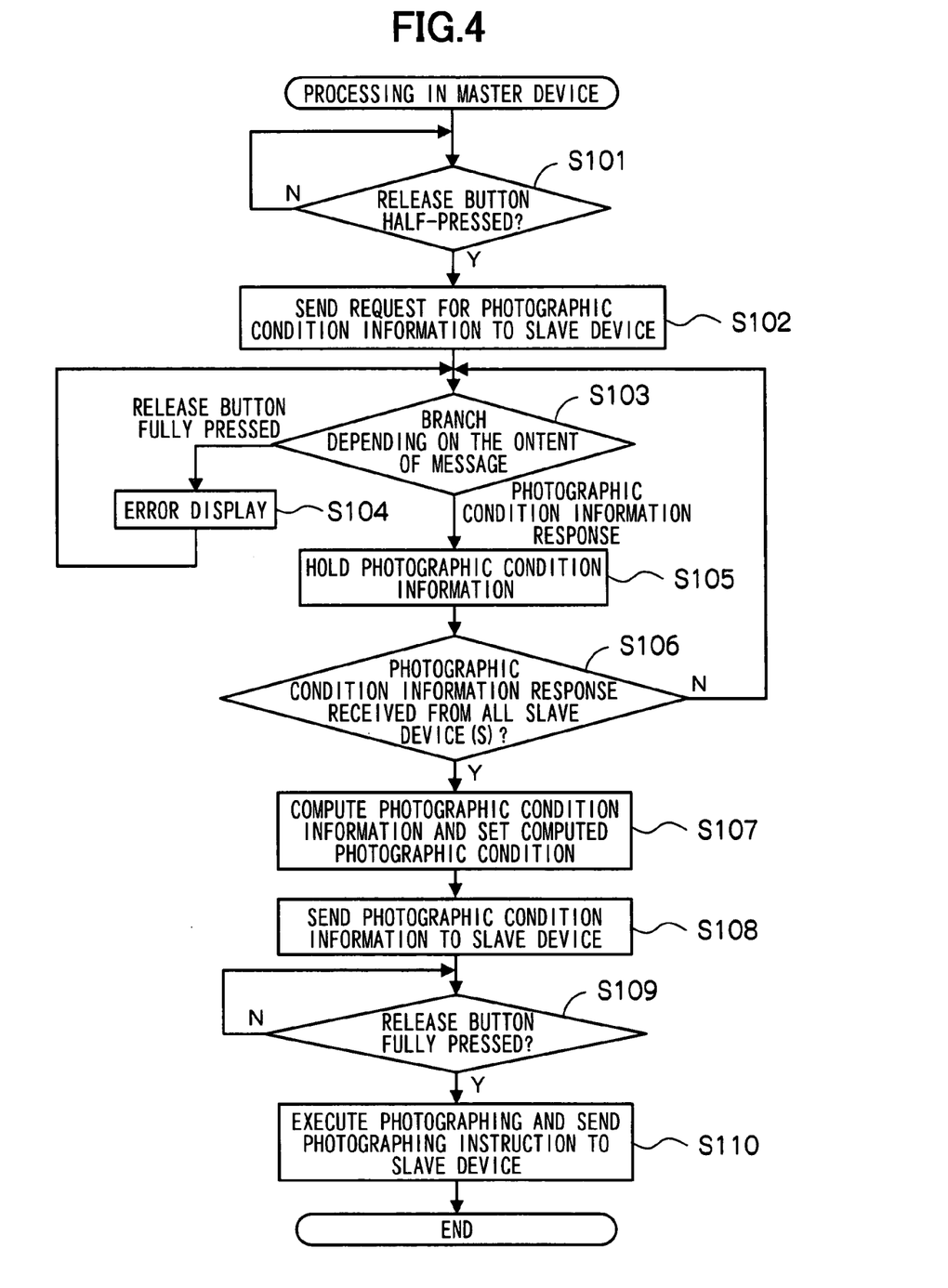
FIG. 4 is a flow chart showing processing of master photographic device in a first processing.

Next, two types of processings will be described. Firstly, the first processing will be described with reference to FIGS. 4 and 5. FIG. 4 is a flow chart showing the processing of the master device.

In first step 101, the master device waits for half pressing of the release button by a user. If half pressing of the release button by a user is detected, the master device sends a photographic condition information request to the slave device(s) in step 102. This photographic condition information request is a processing in which the master device requests photograph information from each slave device in order to compute the photographic condition information.

In the next step 103, the procedure is branched depending on the content of a message subsequently received by the master device. If the message indicates that the release button is fully pressed, an error is indicated (displayed) in step 104 because the photographic condition information has not yet been received from all of the slave device(s). This error indication processing can be, for example, making a beep sound or the like. Then, the procedure returns to step 103.

If the message indicates a photographic condition information response sent from a slave device in accordance with the photographic condition information request, the master device holds the received photographic condition information in step 105. In the next step 106, the master device determines whether or not the photographic condition information response has been received from all of the slave device(s). The slave device(s) mentioned here are all of the slave device(s) to which the master device has sent the photographic condition information request(s). Unless the photographic condition information has been received from all of the slave devices, the procedure returns to step 103.

If the photographic condition information response has been received from all of the slave devices, in step 107, the master device computes the received photographic condition information and photographic condition information acquired by the master device based on the object and sets the computed photographic condition information as its own photographic condition information. Then, in step 108, the master device provides the computed photographic condition information to the slave device(s). By this processing, all of the slave devices can set the same photographic condition information as the master device.

In the next step 109, the master device stands by for full-pressing of the release button by the user. When the release button is fully pressed, in step 110, the master device executes photographing and sends instruction(s) on photographing to the slave device(s).

By the above-described processing, it is possible to provide a photographic system capable of easily setting the same photographic condition in plural photographic devices.

Figure 5:
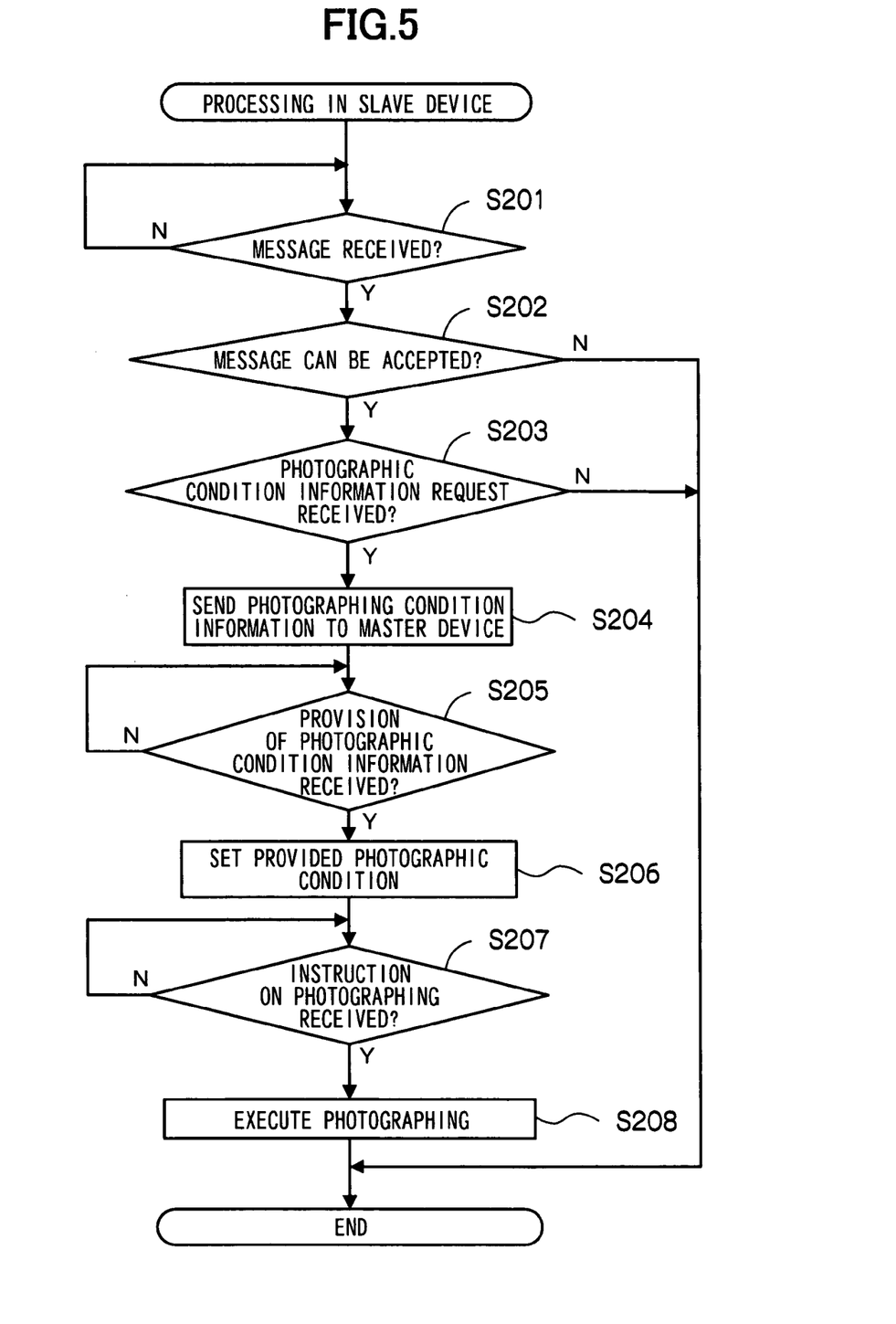
FIG. 5 is a flow chart showing processing of slave photographic device in the first processing.

Next, processing of the slave device(s) corresponding to the processing of the master device will be described with reference to FIG. 5. In step 201, a slave device waits to receive a message. When a message is received, the slave device determines whether or not the message can be accepted in step 202. This determination processing is a processing for a case in which IP addresses for digital cameras which can accept the message can be set to each of the digital cameras within the system, and the master device erroneously sends the message to a digital camera which has no IP address set.

If the message cannot be accepted, the slave device terminates the processing and if the message can be accepted, in step 203, it is determined whether or not the message is a photographic condition information request and if the determination is negative, the processing is terminated.

If the massage is the photographic condition information request, the slave device sends photographic condition information acquired by itself (the slave device) based on the object to the master device in step 204. In the next step 205, the slave device stands by for receiving of provision of photographic condition information. When the provision of the photographic condition information is received, the provided computed photographic condition information is set as photographic condition information for itself in step 206.

In the next step 207, the slave device waits for receiving of instruction on photographing. When the instruction on photographing is received, the slave device executes photographing in step 208.

By the above-described processing, the slave device can set the computed photographic condition information provided by the master device as its own photographic condition information.

Figure 6:
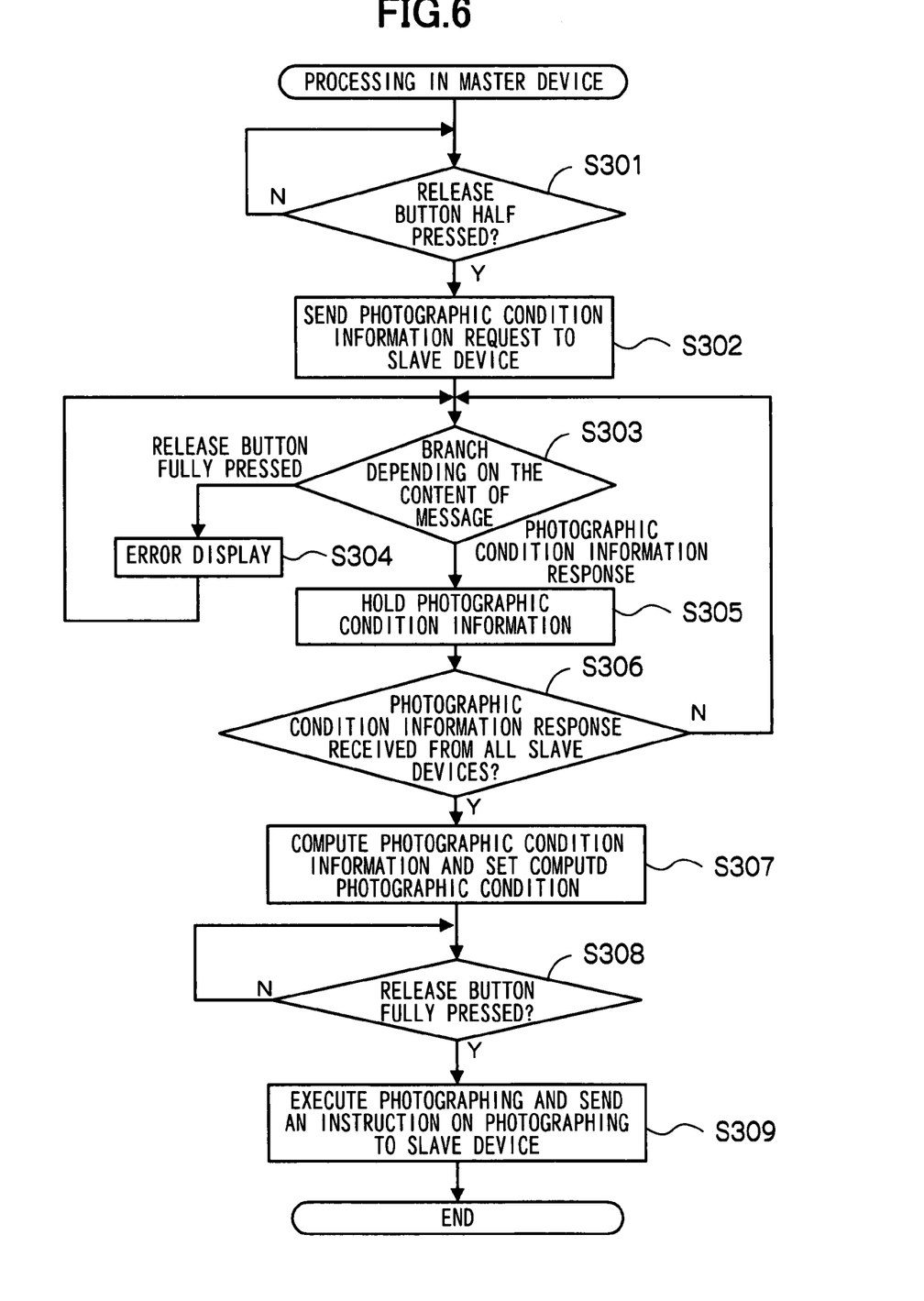
FIG. 6 is a flow chart showing processing of master photographic device in a second processing.

Next, the second processing will be described. FIG. 6 is a flow chart showing the processing performed by the master device in the second processing.

In first step 301, the master device waits for half pressing of the release button by a user. When the half-pressing of the release button is detected, the master device sends a photographic condition information request(s) to the slave device(s) in step 302.

In the next step 303, the procedure is branched depending on the content of a message. If the message indicates full pressing of the release button by the user, an error is indicated in step 304 because the photographic condition information is not received from all the slave device(s). Then, the procedure returns to step 303.

If the message indicates a photographic condition information response sent from the slave device in accordance with the photographic condition information request, the master device holds the received photographic condition information in step 305. In the next step 306, the master device determines whether or not the photographic condition information response(s) is received from all of the slave device(s). Here, the slave device(s) refer to all of the slave devices to which the master device has sent the aforementioned photographic condition information request. Unless the photographic condition information response is received from all of the slave device(s), the procedure returns to step 303.

When the photographic condition information response(s) is received from all of the slave device(s), in step 307, the master device computes received photographic condition information and photographic condition information acquired by itself (the master device) based on the object and sets the computed photographic condition information as its own photographic condition information.

In the next step 308, the master device waits for full pressing of the release button. When the release button is fully pressed, in step 309, the master device executes photographing and sends instruction(s) on photographing to the slave device(s). By the above-described processing, a photographic system capable of setting the same photograph condition easily in the plural digital cameras can be provided.

Figure 7:
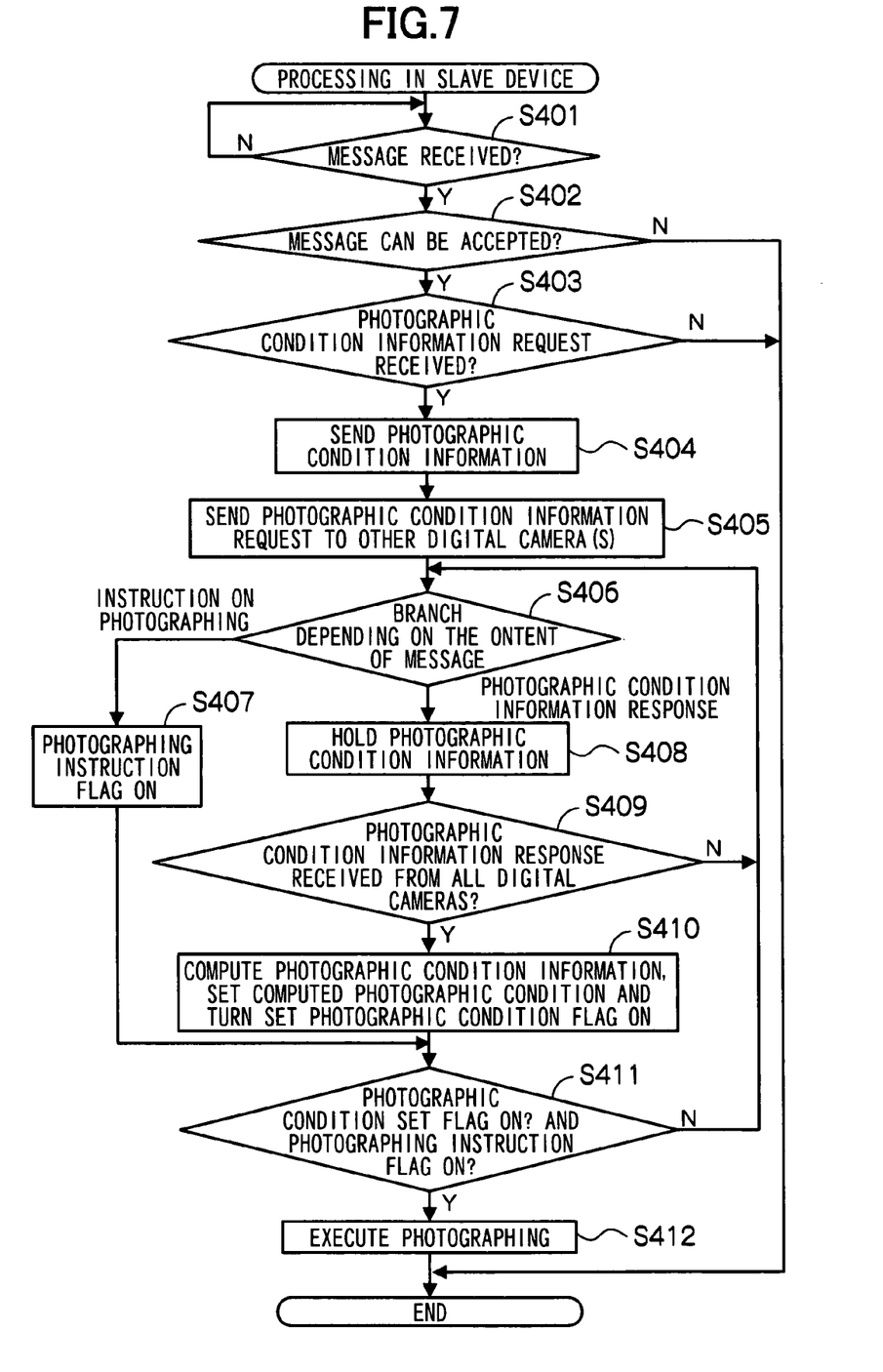
FIG. 7 is a flow chart showing processing of slave photographic device in the second processing.

Next, processing of the slave device corresponding to the aforementioned processing of the master device will be described with reference to FIG. 7. In step 401, the slave device waits for receiving of a message. When the message is received, the slave device determines whether or not the message can be accepted in step 402. This determination processing is the same as that of step 202 in FIG. 5.

If the message cannot be accepted, the slave device terminates the processing, and if the message can be accepted, in step 403, it is determined whether or not that message is a photographic condition information request and if the determination is negative, the processing is terminated.

If the message is the photographic condition information request, the slave device sends photographic condition information acquired by itself (the slave device) based on the object to the master device. In step 405, the photographic condition information request(s) is sent to the other digital camera(s). The other digital camera(s) mentioned here refers to digital cameras except of that slave device which sends the request and may include the master device.

In the next step 406, the procedure is branched depending on the content of the message. If the message is an instruction on photographing, the slave device turns photographing instruction flag on in step 407. This photographing instruction flag is a flag for use in determining whether or not photographing may be executed in the later step 411, which is described later.

If the photographic condition information response is received in step 406, the slave device holds the received photographic condition information in step 408. In the next step 409, the slave device determines whether or not the photographic condition information response(s) is received from all of the digital cameras. The all digital cameras mentioned here refer to the aforementioned other digital camera(s). Unless the photographic condition information response is received from all of the other digital camera(s), the procedure returns to step 406.

When the photographic condition information response(s) is received from all of the digital cameras, the received photographic condition information and photographic condition information acquired by itself based on the object are computed in step 409 and the computed photographic condition information is set as its own photographic condition information. Further, a photographic condition set flag is turned on. This photographic condition set flag is a flag for use in determining whether or not the photographing is permitted in the next step 411.

In step 411, it is determined whether or not the photographing instruction flag is on and also the photographic condition set flag is on. If the determination is negative, the procedure returns to step 406. If the determination is positive, photographing is executed in step 412.

By the above-described processing, the slave device can compute photographic condition information by itself and set the photographic condition information obtained by the computation as its own photographic condition information.

In the above-described first and second processings, any digital camera which is instructed photographing by a user serves as a master device. That is, any of the digital cameras with in the system can operate as a master device. Further, as information to be transmitted/received between the master device and the slave device(s), not only the photographic condition information but also digital image data representing the object of photographing may be exchanged and may be displayed on the LCD 38 of the master device.

As long as the above-described operation is enabled, the plural digital cameras may be constituted of an identical type of digital camera or respectively constituted of different types of digital cameras.

What is claimed is:

1. A photographic system comprising a plurality of photographic devices that are configured to set photographic condition information including at least one of AE information, AF information and AWB information and to execute photographing based on the photographic condition information, the plurality of photographic devices including a master photographic device, which is a photographic device that is instructed to prepare for the photographing, wherein
the master photographic device comprises:
a request section that requests the photographic condition information from another photographic device;
a receiving section that receives the photographic condition information sent from the other photographic device in response to the request;
a first setting section that computes photographic condition information for use in the entire photographic system according to a predetermined equation using the received photographic condition information and photographic condition information acquired by the master photographic device itself based on the status of an object of the photographing, and sets the computed photographic condition information as its own photographic condition information;
a provision section which provides the computed photographic condition information to the other photographic device;
a first photograph execution section which executes the photographing based on the set photographic condition information; and
a photograph execution instruction section which instructs execution of the photographing to the other photographic device, and
each of the other photographic devices comprises a sending section which sends photographic condition information acquired by the other photographic device based on the status of the object of the photographing to the master photographic device when the photographic condition information is requested by the master photographic device.

2. The photographic system of claim 1 wherein each of the other photographic devices further comprises:
a second setting section that sets the provided computed photographic condition information as its own photographic condition information; and
a second photograph execution section which executes the photographing based on the photographic condition information set by the second photographic condition information setting section, when execution of the photographing is instructed by the master photographic device.

3. The photographic system of claim 1 wherein the plurality of photographic devices are all constituted of an identical photographic device.

4. The photographic system of claim 1 wherein the plurality of photographic devices are respectively constituted of different photographic devices.

5. The photographic system of claim 1 wherein the master photographic device is selected from any of the plurality of photographic devices.

6. The photographic system of claim 1 wherein each of the plurality of photographic devices comprises a communication interface for communicating with the other photographic devices.

7. The photographic system of claim 6 wherein the communication interface comprises a radio communication interface.

8. A photographic system comprising a plurality of photographic devices configured to set photographic condition information including at least one of AE information, AF information and AWB information and to execute photographing based on the photographic condition information, the plurality of photographic devices including a master photographic device, which is a photographic device that is instructed to prepare for the photographing, wherein
the master photographic device comprises:
a first request section that requests the photographic condition information from another photographic device;
a first receiving section that receives the photographic condition information sent from the other photographic device in response to the request;
a first sending section that sends photographic condition information acquired by the master photographic device based on the status of an object of the photographing to the other photographic device when the photographic condition information is requested by the other photographic device;
a first setting section that computes photographic condition information for use in the entire photographic system according to a predetermined equation using the photographic condition information received by the first receiving section and the photographic condition information acquired by the master photographic device and sets the computed photographic condition information as its own photographic condition information;
a first photograph execution section that executes the photographing based on the photographic condition information set by the first setting section; and
a photograph execution instruction section that instructs execution of the photographing to the other photographic device, and
each of the other photographic devices comprises a second sending section that sends photographic condition information acquired by the other photographic device itself based on the status of the object of the photographing to the master photographic device when the photographic condition information is requested by the master photographic device.

9. The photographic system of claim 8 wherein each of the other photographic devices further comprises:
a second request section that requests the photographic condition information from the other photographic devices;
a second receiving section that receives the photographic condition information sent from the other photographic devices in response to the request;
a second setting section that computes photographic condition information for use in the entire photographic system according to a predetermined equation using the photographic condition information acquired by the second request section and photographic condition information acquired by the photographic device itself based on the status of an object of the photographing and sets the computed photographic condition information as its own photographic condition information; and
a second photographing execution section that executes photographing when execution of the photographing is instructed by the master photographing device.

10. A photographic method in a photographic system including a plurality of photographic devices configured to set at least one item of photographic condition information and to execute photographing according to the set photographic condition information, the method comprising:
a first photographic device of the plurality of the photographic devices receiving a photographing preparation instruction;
the first photographic device performing
requesting a photographic condition information from a second photographic device;
receiving photographic condition information sent from the second photographic device in response to the request from the first photographic device;
computing photographic condition information for use in the entire photographic system according to a predetermined equation using the received photographic condition information and photographic condition information acquired by the first photographic device based on the status of an object of the photographing and setting the computed photographic condition information as its own photographic condition information;
providing the computed photographic condition information to the second photographic device; and
executing the photographing based on the set photographic condition information in accordance with reception of a photograph execution instruction and instructing execution of the photographing to the second photographic device.

11. The photographic method of claim 10 further comprising the second photographic device sending photographic condition information acquired by the second photographic device based on the status of the object of the photographing in response to the request from the first photographic device, to the first photographic device.

12. The photographic method of claim 10 further comprising the second photographic device performing
setting the provided computed photographic condition information as its own photographic condition information and
executing the photographing with the set photographic condition information in accordance with the instruction on photograph execution from the first photographic device.

13. The photographic method of claim 10 further comprising the first photographic device sending the photographic condition information acquired by the first photographic device to the second photographic device in response to a request from the second photographic device.

14. The photographic method of claim 10 further comprising the second photographic device performing
requesting the photographic condition information from other photographic devices;
receiving the photographic condition information sent from the other photographic devices in response to the request;
computing photographic condition information for use in the entire photographic system according to a predetermined equation using the received photographic condition information and photographic condition information acquired by the second photographic device based on the status of the object of the photographing and setting the computed photographic condition information as its own photographic condition information; and
executing the photographing in accordance with an instruction to execute the photographing from the first photographic device.

15. The photographic method of claim 10 wherein the at least one item of the photographic condition information includes at least one of AE information, AF information or AWB information.

16. The photographic method of claim 10 wherein the first photographic device is selected from any of the plurality of the photographic devices.

17. A photographic device for a photographic system including a plurality of photographic devices, the photographic device configured to set at least one item of photographic condition information and to execute photographing with the set photographic condition information, the photographic device comprising:
- an instruction receiving section that receives a photographing preparation instruction and a photographing execution instruction;
- a request section that requests photographic condition information from another photographic device in accordance with the photographing preparation instruction;
- a receiving section that receives the photographic condition information sent from the other photographic device;
- a setting section that computes photographic condition information for use in the entire photographic system according to a predetermined equation using the received photographic condition information and photographic condition information acquired by the photographic device based on the status of an object of the photographing and sets the computed photographic condition information as its own photographic condition information;
- a provision section that provides the set photographic condition information to the other photographic device; and
- a photographing execution section that executes the photographing based on the set photographic condition information in accordance with reception of a photographing execution instruction and instructs execution of the photographing to the other photographic device if the photographing preparation instruction has been received.

18. The photographic device of claim 17 wherein the provision section sends the photographic condition information acquired by the photographic device to the other photographic device in accordance with a request from the other photographic device.

19. The photographic device of claim 17 wherein, when the photographic device receives the photographic condition information from the other photographic device, the setting section sets the provided photographic condition information as its own photographic condition information.

20. The photographic device of claim 17 wherein the photographing execution section executes the photographing in accordance with a photographing execution instruction received from the other photographic device.

21. The photographic device of claim 17 wherein the at least one item of the photographic condition information includes at least one of AE information, AF information or AWB information.

* * * * *